(12) United States Patent
Batten et al.

(10) Patent No.: US 6,517,715 B1
(45) Date of Patent: Feb. 11, 2003

(54) READILY SERVICEABLE SEPARATOR UNIT WITH A FOCUSING PLATE

(75) Inventors: William C. Batten, Asheboro, NC (US); Bruce W. Kyles, Asheboro, NC (US)

(73) Assignee: Thermaco, Inc., Asheboro, NC (US)

( * ) Notice: Subject to any disclaimer, the term of this patent is extended or adjusted under 35 U.S.C. 154(b) by 0 days.

(21) Appl. No.: 09/439,900

(22) Filed: Nov. 12, 1999

(51) Int. Cl.[7] ................................. C02F 1/40; E03F 5/16
(52) U.S. Cl. ..................... 210/232; 210/521; 210/532.1; 210/538; 210/540; 210/539
(58) Field of Search ................................. 210/538, 539, 210/540, 232, 521, 522, 532.1, 537

(56) References Cited

U.S. PATENT DOCUMENTS

| | | |
|---|---|---|
| 1,159,044 A | 1/1915 | Kelly, Jr. |
| 1,164,527 A * | 12/1915 | Kelly, Jr. ..................... 210/540 |
| 1,200,951 A | 10/1916 | Kelly, Jr. |
| 1,864,511 A | 6/1932 | Jones |
| 3,225,936 A | 12/1965 | Ballestra ..................... 210/519 |
| 4,088,578 A | 5/1978 | Yoshioka et al. ............. 210/73 |
| 4,149,973 A | 4/1979 | Harris ......................... 210/305 |
| 4,400,274 A | 8/1983 | Protos ......................... 210/302 |
| 4,554,074 A | 11/1985 | Broughton ................... 210/519 |
| 5,405,538 A | 4/1995 | Batten ......................... 210/744 |
| 5,492,619 A | 2/1996 | Batten ......................... 210/86 |
| 5,554,301 A | 9/1996 | Rippetoe et al. ............. 210/748 |
| 5,705,055 A | 1/1998 | Holloway, Jr. et al. ...... 210/115 |
| 5,714,069 A | 2/1998 | Sager ........................... 210/519 |
| 5,804,082 A * | 9/1998 | Lowery, Jr. .................. 210/800 |
| 5,827,425 A | 10/1998 | McKinnon ................... 210/194 |
| 5,861,098 A | 1/1999 | Morrison ..................... 210/774 |

* cited by examiner

Primary Examiner—Robert Popovics
(74) Attorney, Agent, or Firm—MacCord Mason PLLC

(57) ABSTRACT

An apparatus for separating or segregating an insoluble or immiscible fluid mixture into its denser and less dense components is disclosed. The apparatus' serviceability is enhanced through the use of a removably secured focusing plate. The apparatus may be advantageously used to separate grease/water mixtures of commercial food preparation operations into a gray water component for disposal in sewer lines and a grease component for storage and subsequent appropriate disposal.

15 Claims, 3 Drawing Sheets

READILY SERVICEABLE SEPARATOR UNIT WITH A FOCUSING PLATE

BACKGROUND OF THE INVENTION

This invention pertains to a separator unit that may be integrated into a system that involves a mixture of insoluble or immiscible fluids to substantially separate the fluid mixture into its components. The separator unit may be used in a commercial food preparation operation to substantially separate a grease/water mixture into a gray water component for direct disposal into a sewer line and a grease component for removal and subsequent appropriate disposal.

Grease/water mixtures dispose directly into sewer lines burden municipal sewage systems since the grease builds up in sewer lines and on equipment in sewage treatment plants. To offset maintenance costs resulting from direct grease discharges into municipal sewers, municipal authorities surcharge commercial food preparation operations that directly discharge grease/water mixtures. The present invention may be used to relieve such sewage surcharges.

The art is replete with examples of devices for separating insoluble or immiscible fluid mixtures into their components. Although such devices may be effective in separating insoluble or immiscible fluid mixtures into their components, they lack serviceability.

U.S. Pat. No. 1,864,511 discloses a method and apparatus for separating immiscible substances. A main tank 1 is provided with a main separating compartment 2. The compartment 2 is formed between the front and back walls of the main tank 1 and between partitions 5 and 9 that extend across the main tank 1 and are spaced from the bottom of the main tank 1 to provide passages 6 and 10 respectively below the partitions 5 and 9. A partition 4 extends across the top of the separating compartment 2 and to a point close to partition 9. From partition 4, a vertical partition 14 extends upwardly close to partition 9 to form a discharge passage 15 from which the flow of a lighter constituent is controlled by a weir 16 at the upper edge of partition 14. Since partition 4 appears fixably attached to main tank 1, the apparatus lacks serviceability.

U.S. Pat. No. 1,200,951 discloses a separator that includes a grease and oil collector E removably secured within the trap A. The bottom of the collector E is provided with an inlet G having a wall G' that projects within the collector above a normal level P, of the fluids in the trap A. Preferably, the wall G' is formed integral with the bottom of collector E that slopes upward toward the inlet G and has a depending skirt or grease dam H. An intercepting chamber I is formed by the wall G', the incline bottom and the dam H. Within the collector E is a pipe L, which fills with water in use, having an open end in proximity to the bottom of the collector.

U.S. Pat. No. 3,225,936 discloses an apparatus for continuously separating liquids having different specific gravities. A mixture to be separated is introduced through a pipe 22 into a uniformizer 7 and then into the apparatus. Within the apparatus, the mixture passes through gaps formed by sloped sheets where upon the liquids separate spontaneously, by reason of their different specific gravities, into their components.

U.S. Pat. No. 4,088,578 discloses a process and apparatus for separating oil from water contaminated with oil. The apparatus includes a partition plate 13 consisting of a flat region 13a and another inclined or deflected region 13b. The flow of oil is first horizontally along the flat region 13a of the partition plate 13 and subsequently changes into a rising stream of separated oil that climbs along inclined or deflected region 13b that is at an angle from 70 to 90 degrees with respect to the horizon. The deflection of the flow at such an angle is said to greatly enhance the smooth flowing of oil particles so that the oil can be rapidly separated from the water contaminated oil. Thus, the sloping region 13b is not provided for the purpose of sequester of the light component, but for aiding in its joint movement with water in a way that is said to lead to separation.

U.S. Pat. No. 4,149,973 discloses a pressurized three stage horizontal separator for separating oil from water that includes a first stage for gravity separation of oil from water as an oil-water mixture flows along upwardly sloping baffles 48.

U.S. Pat. No. 4,400,274 discloses a tank having baffles or dams for separating low and high density constituents of a liquid. A top panel 16 in a tank 60 extends in an inclined manner upwardly in an upstream direction over about a third of the length of the tank 16. In addition, baffles 43 and 44 divide the liquid flow into an upward and downward path causing acceleration that tends to enhance the separation of low and high density constituents. However, since top panel 16 is fixably attached to tank 60, the tank lacks serviceability.

U.S. Pat. No. 4,554,074 discloses a separator for an immiscible fluid mixture. The separator includes a fluid separator box having pairs of channels that convert an initial inlet turbulent high velocity immiscible fluid mixture flow to a substantially lamellar low velocity fluid flow. In an embodiment relating to a cylindrical tank, an inverted funnel baffle 12 is disposed and secured above the fluid separator box and provides a conductive pipe outlet for the separated less dense fluid. In an alternative embodiment relating to a rectangular tank, the inverted funnel 12 is replaced with a tank baffle 96 disposed the length of the tank. This separator lacks serviceability.

U.S. Pat. No. 5,492,619, in an alternative embodiment, discloses the inclusion of a concentrator that is provided in the form of a slanted baffle plate like a witch's hat above an inlet 12 in a collection tank for an automatic grease collection system. This system also lacks serviceability.

A particularly popular and effective separator has been the Big Dipper® separator sold by Thermaco, Inc. of Asheboro, N.C., USA. It uses a rotating oleophilic wheel to pull grease from the top of a body of effluent to be scraped off by a blade. However, it has been found that fine solids in the grease can foul the contact between the blade and the wheel, making separation inefficient.

It is very apparent that there is a need to provide a separator unit for insoluble or immiscible fluid mixtures that overcome the above problems with the prior art. More specifically, there is a need to provide a separator unit that includes having excellent serviceability.

SUMMARY OF THE INVENTION

The present invention satisfies the need for a separator unit that is very serviceable. The separator unit of the present invention includes a vessel containing a separation or segregation volume. The separator unit includes a removable focusing plate situated above the separation or segregation volume. The vessel of the separator unit includes an inlet end and an outlet end connected by a bottom and sidewalls. At each of the inlet and outlet ends there are baffles creating inlet and outlet channels as well as defining the separating or segregation volume. The upper portion of the separation or segregating volume is bounded by the focusing plate placed within the vessel and between the baffles and sidewalls of the vessel. The focusing plate guides a component of the immiscible or in soluble fluid mixture having a lower specific gravity or density toward an access port. The component having the lower specific gravity or density is removed from the region proximate to the access port, through an access line after a sufficient quantity has accumulated. The simplicity of the separator unit adds to its serviceability. That is, removably fastening of the focusing plate within the vessel simplifies the plate's insertion and removal for the frequent and unencumbered service of the separator unit without the need for special tools or inordinate amounts of down time.

BRIEF DESCRIPTION OF THE DRAWINGS

These and other features, aspects and advantages of the present invention will be better understood by those skilled in the art after a review of the following description, appended claims, and accompanying drawings where:

DETAILED DESCRIPTION OF THE PREFERRED EMBODIMENT

Figure 1:
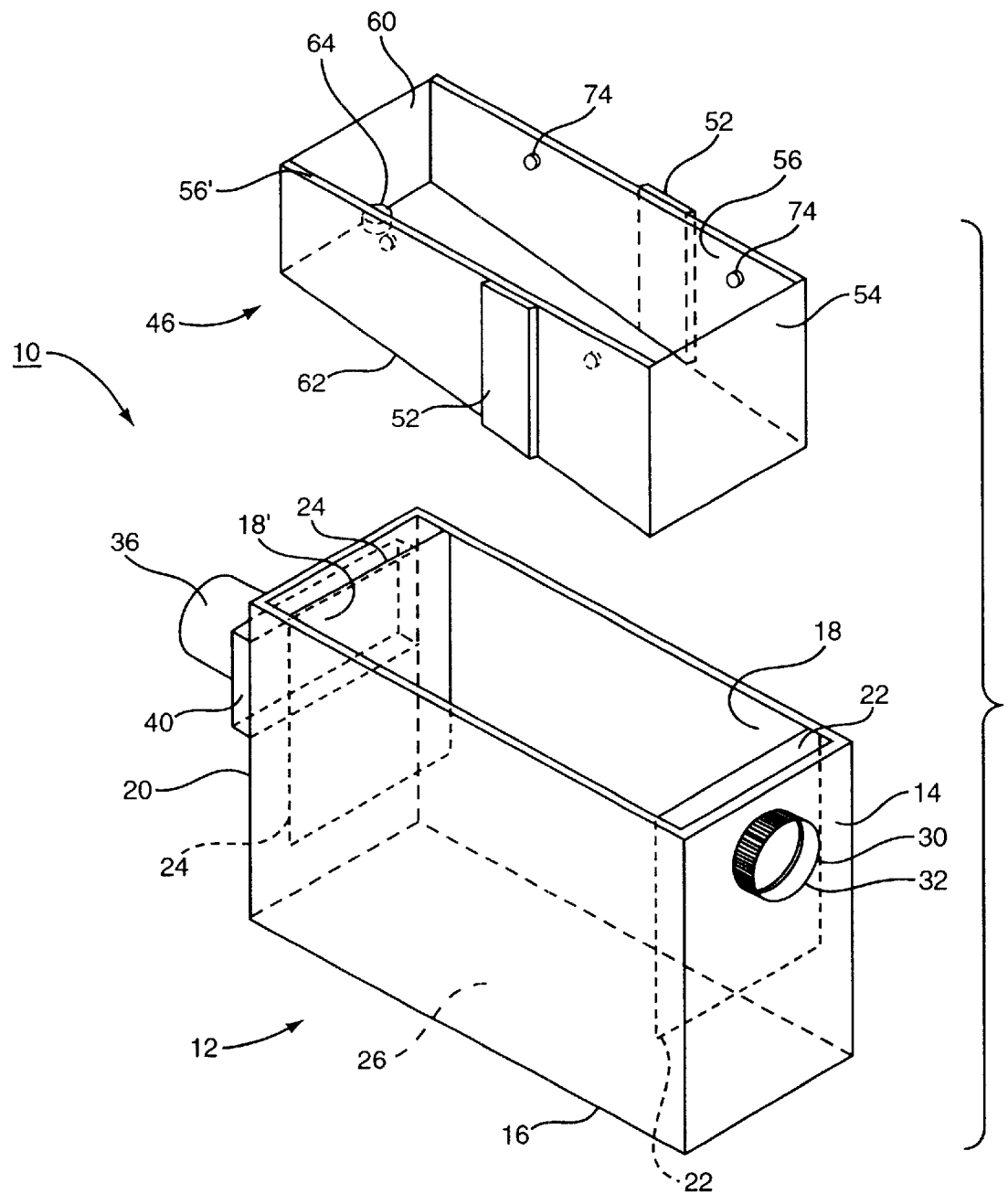
FIG. 1 depicts a perspective view of the separator unit for separating an insoluble or immiscible fluid mixture into its less dense component and denser component.

An embodiment of the present invention, depicted schematically in FIG. 1, includes a separator unit 10 comprising a vessel 12 and an insert 46 with a sloped bottom. Vessel 12 includes inlet end wall 14, outlet end wall 20, sidewalls 18 & 18' and bottom 16. Inlet baffle 22 and outlet baffle 24 lie within a volume bounded by bottom 16 and walls 14, 18 & 18', and 20. Inlet baffle 22 and outlet baffle 24 bound a portion of separation or segregation volume 26. Inlet baffle 22 extends between sidewalls 18 & 18' (from their tops) toward, but not to, bottom 16 to create an inlet channel between the inlet baffle 22 and inlet end wall 14 that communicates with separation or segregation volume 26 below baffle 22. Inlet 30 is located in inlet wall 14 and provides communication between inlet line 32 and the inlet channel. Outlet baffle 24 extends between sidewalls 18 & 18' (from their tops) toward, but not to, bottom 16 to create an outlet channel between the outlet baffle 24 and outlet end wall 20 that communicates with separation or segregation volume 26 below baffle 24. Outlet 40 is located in outlet wall 20 and provides for communication between outlet line 36 and the outlet channel.

Focusing plate 62 of sloped insert 46 bounds the upper portion of separation or segregation volume 26. Inlet wall 54, sidewalls 56 & 56' and outlet wall 60 intersect with focusing plate 62 to form the body of sloped insert 46. In use, sloped insert 46 resides within an upper potion of the volume bounded by sidewalls 18 & 18', inlet baffle 22 and outlet baffle 24. The top of vessel 12 coincides substantially with the top of sloped insert 46. In this manner, separation or segregation volume 26 is bounded by sidewalls 18 & 18', inlet baffle 22, outlet baffle 24, bottom 16 and focusing plate 62. Fasteners 74 (such as screw, clasps or other suitable fasteners) removably secure sloped insert 46 to sidewalls 18 & 18'. The fasteners prevent insert 46 from falling too far and also prevent it from floating, as the case may be. Although focusing plate is shown to be a part of sloped insert 46 in FIGS. 1, 2 & 3, applicants contemplate that focusing plate may be a simple plate that is removably attachable to sidewalls 18 & 18', or inlet baffle 22 and outlet baffle 24, or both.

An access port 64 is formed in focusing plate 62 at an elevated end of sloped insert 46, near outlet wall 60. Access port 64 provides a path for a component of an insoluble or immiscible fluid mixture 34 having a lower specific gravity or density, to exit the uppermost section of separation or segregation volume 26. In addition the port 64 may have a vent for permit pressure equalization between the volume under and above focusing plate 62.

During an initial introduction of an insoluble or immiscible fluid mixture into separator unit 10, access port 64 provides a path for gases, which have been urged to the elevated end of focusing plate 62 and accumulated adjacent to focusing plate 62, to exit the uppermost section separation or segregation volume 26. During the operation of separator unit 10, access port 64 provides a path for liquids, in particular, the component of the insoluble or immiscible fluid mixture 34 having the lower specific gravity or density, to exit the uppermost section separation or segregation volume 26. A method such as for example, pumping, may be used to withdraw the accumulated component having the lower specific gravity through access line 66.

A gasket type barrier 52 may be placed between sidewalls 56 & 56' of the sloped insert 46 and sidewalls 18 & 18' of vessel 12 to prevent the movement of fluid between and along the length of sloped insert 46 and between sidewalls 56 & 56' and sidewalls 18 & 18'. The gasket type barrier 55 may be any material that forms the requisite seal including for example cellular polymers, such as styrene foams (as for example expanded polystyrene also known as "Styrofoam" an early tradename of DOW) and urethane foams, that are compatible with the insoluble or immiscible fluid mixture, its dense component, and its less dense component. The seal need not be perfect; it need only prevent convective current type flow.

Optionally, a fluid seal (not depicted) may be provided along the perimeter of focusing plate 62 to prevent any of the insoluble or immiscible fluid mixture, its denser component, and its less denser component from passing beyond the plane of focusing plate 62. Likewise, fluid seal 50 may be any material that functions to prevent the breach beyond the plane of focusing plate 62, is compatible with insoluble or immiscible fluid mixture, its denser component, and its less dense component while maintaining the ease of removal and replacement of focusing plate 62 from and to vessel 12.

Figure 2:
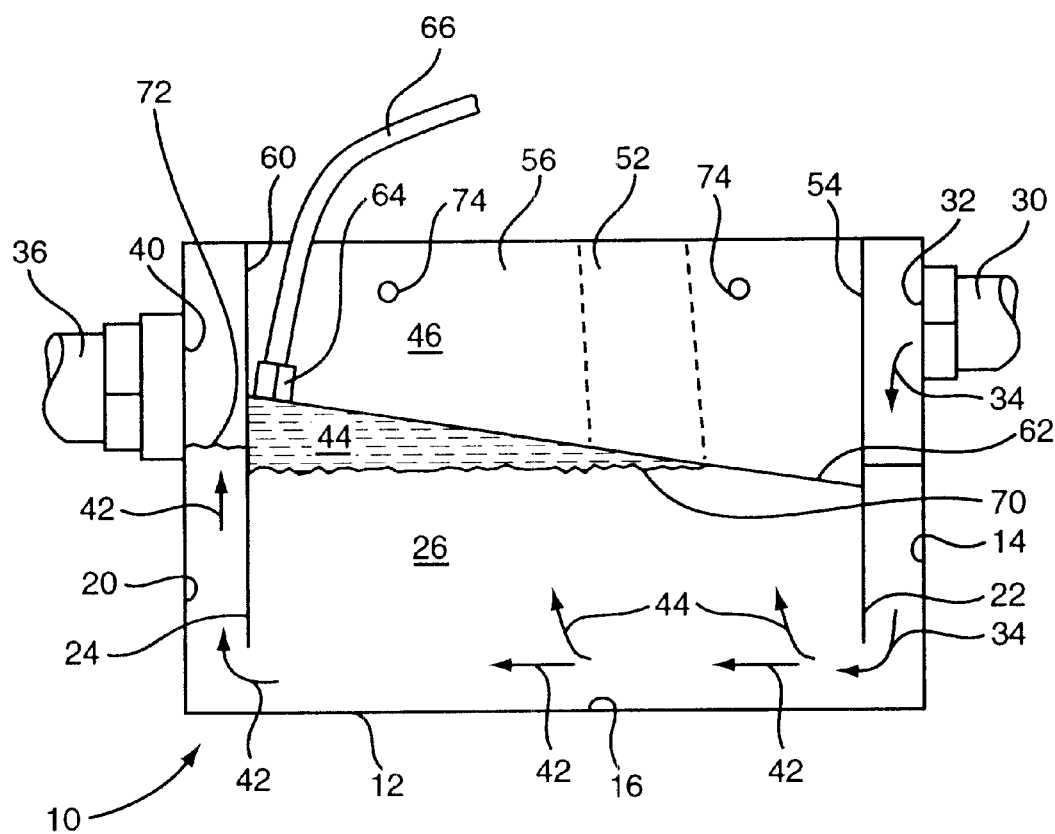
FIG. 2 depicts a cross-sectional schematic of the separator unit of FIG. 1 for separating an insoluble or immiscible fluid mixture into its less dense component and denser component.

FIG. 2 is a vertical-sectional schematic of separator unit 10. Following installation, separator unit 10 contains air. During an initial transient period, insoluble or immiscible fluid mixture 34 is introduced into separator unit 10 through inlet 32 and inlet channel from inlet line 30 and accumulates within the lower portion of vessel 12. Separation of the less dense component 44 from the denser component 42 may begin and produce a separated layer of less dense component 44 on denser component 42. The denser component 42 may extend from inlet wall 14 to outlet wall 20. Over time during this transient period as additional insoluble or immiscible fluid mixture 34 is introduced into separator unit 10, separated layer eventually contacts the lower portion of focusing plate 62 (on the right in FIG. 2). During this period, separated layer may be contained within separation or segregation volume 26 and extent from inlet baffle 22 to outlet baffle 24. Eventually at the end of the transient period, the volume of insoluble or immiscible fluid mixture 34 introduced into separator unit 10 is such that the separated layer of the less dense component 44 is urged to the uppermost region of focusing plate 62 and accumulates at access port 64. Any air that may have accumulated may be released through access port 64 to allow separated layer to communicate with access port 64.

The transient period might occur in a single step by introducing a volume of insoluble or immiscible fluid mixture 34 sufficient to fill inlet channel, separation or segregation volume 26, and outlet channel, in which case some insoluble or immiscible fluid mixture 34 may pass through separator unit 10 without segregating into its components. To avoid the passing of unsegregated insoluble or immiscible fluid mixture 34 through separator unit 10, a volume of denser component 42 sufficient to fill inlet channel, separation or segregation volume 26, and outlet channel to outlet line 36 may be initially be introduce into separator unit 10.

During the steady state operation of separator unit 10, insoluble or immiscible fluid mixture 34 is also introduced into inlet channel through inlet 32 from inlet line 30 and travels toward bottom 16. As insoluble or immiscible fluid mixture 34 passes inlet baffle 22, the less dense component 44 and denser component 42 separate.

As insoluble or immiscible fluid mixture 34 continues to flow toward outlet 40 separation continues. Less dense component 44 rises to strike focusing plate 62 and is urged to accumulate proximally to access port 64. Entrained air may also accumulate in the region of access port 64 and might need to be bled off to allow less dense component 44 to accumulate closer to access port 64. In time, denser component 42 travels beyond separation or segregation volume 26 under baffle 24 through outlet channel and outlet 40 to outlet line 36 for further disposition. Less dense component 44, after sufficient accumulation is removed through access port 64 via access line 66.

Although separator unit 10 is depicted in FIG. 1 as occupying a substantially rectangular prismatoid, it will be appreciated by those skilled in the art that any shape that accomplishes the separation of the insoluble or immiscible fluid mixture 34 into its component may be used. For example, vessel 12 might be a cylinder having an irregular cross-section or a regular cross-section, such as for example, circular, elliptical, polygonal, etc. Likewise focusing plate 62 may also be any shape that substantially corresponds to the shape of vessel 12 and accomplishes separation. Focusing plate 62 might advantageously posses a shape that directs less dense component to the volume substantially below access port 64. For example, if the volume defined by inlet baffle 22 and outlet baffle 24 were circular then focusing plate could be an oval or elliptical. The arcuate character of focusing plate might then be used to accommodate access port 64, having the narrower end furthest from the bottom of vessel 12. Through the corresponding arcuate form of outlet baffle 24, less dense components would then be concentrated closer to access port 64.

The separator unit 10 of the present invention addresses a long felt need in the industry, namely, serviceability. Since focusing plate 62 resides removably within vessel 12, simply loosening fasteners 74 provides access to the interior of separator system 10. During such access, sediments that may have become entrained in insoluble or immiscible fluid mixture 34 to settle on bottom 16 might be removed. Alternatively, it is conceivable that access port 64 and/or access line 66 might become clogged. The ease with which separator system 10 or its parts may be disassembled, cleaned or replaced, and reassembled provides the advantage of substantially little or no down time for repairs and replacements.

Figure 3:
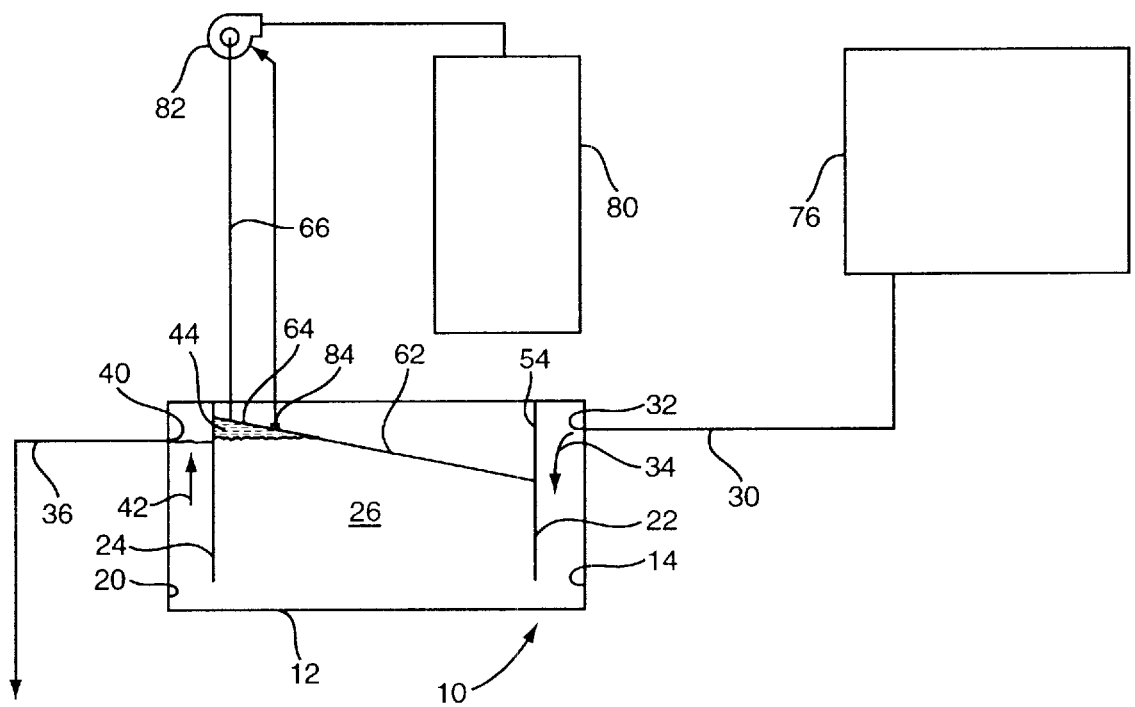
FIG. 3 depicts a schematic of a system incorporating the separator unit for separating an insoluble or immiscible fluid mixture into its less dense component and denser component.

Separator unit 10 may be advantageously used to separate grease/water mixtures into a grease component and gray water component in commercial food preparation operations. FIG. 3 schematically depicts an operation incorporating separator unit 10. The operation includes a source 76 of an insoluble or immiscible fluid mixture, the separator unit 10, a retainer 80 for the less dense component 44 and a pump 82. Insoluble or immiscible fluid mixture 34 is transferred to separator unit 10 through inlet line 30. Within separation or segregation volume 26 the denser component 42 and less dense component 44 segregate. Denser component 42 proceeds below outlet baffle 24, through outlet 40, to outlet line 36 for eventual disposal such as to a sewer. Less dense component 44 accumulates at the upper end of focusing plate 62 proximate to access port 64. Pump 82 is used to transfer the less dense component from separator unit 10 to retainer 80.

The pump may be selectively actuated by various means. For example, if the less dense component 44 comprises grease, then a grease sensor 84 in the upper part of separation or segregation volume 26 may sense grease and output a signal to actuate pump 82, which continues to run until grease is no longer sensed, or for some preset period of time. Alternately, the pump actuation may be toggled by a timer. Also, access line 66 to the pump 82 may include a dip tube (not depicted) adjustably extending below focusing plate 62 and into the separation or segregation volume 26 to pump to a selected depth below focusing plate 62.

With respect to commercial food preparation operations, source 76 of FIG. 3 may include any equipment or process that produces or results in a grease/water mixture. Examples of equipment that perform processes that might result in grease/water mixtures include a sink, a dishwasher, a cooker, pasteurizer, a blancher, an oven, a dryer, a grille etc. Source 76 may include one or more of the above.

In commercial food preparation operations, the grease component may have a tendency to solidify at the normal operating temperature (e.g., substantially room temperature) of separator unit 10. Therefore, it may be advantageous to provide a heater (not depicted) in the vicinity of access port 64 and/or along access line 66 to maintain the grease in a liquid state. In further regards to commercial food preparation operations, separator unit 10 may be of any size that effectively segregates the grease component from gray water component. For example, in one application, applicants contemplate that separator unit 10 might be of a size that fit beneath a restaurant sink. In another application, the inventor contemplates that separator unit 10 be of a size such as a typical walk-in refrigerator. In yet another application, the inventor contemplates that separator unit 10 be of the size of an inground storage or septic tank. In any of these applications, separator unit 10 is constructed to maintain its serviceability.

Separation unit 10 may be constructed from any materials that are compatible with the insoluble or immiscible fluid mixture 34 to be separated, as well as its less dense and denser components. In certain applications, the construction materials might also be dictated by industry and/or government standards. For example, in commercial food preparation operations, county and/or city health codes might need to be consulted and, in the case that the food products are being exported, foreign government health codes might need to be consulted. Notwithstanding the above, separator unit 10, and its component might be constructed from metals; ceramics including concrete and moldable cements; polymers; composites base on metals, ceramics, and polymers; either partially, completely, or with combinations thereof. A preferred material is stainless steel.

The previously described versions of the present invention have many advantages, including allowing the separation of insoluble or immiscible fluids into their components. More particularly, the present invention is advantageous for use in separating grease/water mixtures particularly in commercial food preparation operations to relieve surcharges that might otherwise be charged by municipal authorities.

Although the present invention has been described in considerable detail with respect to a certain preferred versions thereof, other versions are possible. Examples include the separation of benzene/water mixtures in refining operations, the separation of oil/water mixtures within ships, the separation of other insoluble or immiscible fluid mixtures be they organic, inorganic or mixtures thereof. Therefore, the spirit and scope of the appended claims should not be limited to the description of the preferred versions herein.

All patents and other documents identified in the present application are hereby incorporated by reference.

We claim:

1. A separator unit for use in segregating an immiscible fluid mixture in to its components comprising:

(a) a vessel comprising a bottom, a sidewall, a first baffle, a second baffle, an inlet and an outlet, wherein the sidewall extends from the bottom to bound a major volume of the vessel and terminates to define a major opening of the vessel at an end away from the bottom; the inlet resides in a first location within the sidewall away from the bottom and the outlet resides in a second location within the sidewall away from bottom and opposite the first location; the first baffle extends between two locations on the sidewall from the major opening toward the bottom, but not contacting to the bottom, proximal to the inlet opening to define an inlet channel between the first baffle and that portion of the sidewall between the two locations on the sidewall; and the second baffle extends between two other locations on the sidewall from the major opening toward the bottom, but not to the bottom, proximal to the outlet opening to define an outlet channel between the second baffle and that portion of the sidewall between the two other locations on sidewall; and (b) a focusing plate and an access port within the focusing plate, wherein the focusing plate is removably secured within a portion of vessel bound by the bottom, first baffle, second baffle, and sidewall such that the focusing plate is inclined with respect to the horizontal and the access port vent within the focusing plate is proximal to that portion of the focusing plate furthest from bottom, wherein the outlet defines a line of division between the segregated lighter and heavier components of the immiscible fluid mixture, wherein the line of division is below the top of the focusing plate.

2. A separator unit according to claim 1, wherein the bottom is defined by a circle and the sidewall comprises a hollow cylinder.

3. A separator unit according to claim 1, wherein the bottom is defined by a polygon and the sidewall comprises sections having dimensions that substantially correspond to segments of the perimeter of the polygon.

4. A separator unit according to claim 1, wherein a volume bound by sidewall, first baffle, and second baffle comprise a cylinder and further comprising a removable sloped insert comprising the focusing plate and having a sliced cylinder shape corresponding dimensionally to the volume.

5. A separator unit according to claim 1, further comprising an inlet line communicating with the inlet, an outlet line communicating with the outlet, and an access line communicating with the vent/access.

6. A separator unit according to claim 1, further comprising a sloped insert comprises an insert sidewall extending from the focusing plate and terminating so as to correspond with the major opening of the vessel.

7. A separator unit according to claim 6, further comprising a first barrier between insert sidewall and vessel sidewall, extending from focusing plate toward major opening and residing between first baffle and second baffle; and a second barrier between insert sidewall and vessel sidewall, extending from focusing plate toward major opening and reside between first baffle and second baffle opposite to first barrier.

8. A separator unit according to claim 1, further comprising a seal along the perimeter of focusing plate.

9. A separator unit according to claim 1, further comprising at least one fastener for removably securing the focusing plate within the vessel.

10. A system to handle grease/water mixtures comprising:

(a) a source of a grease/water mixture;

(b) a separator unit for separating the grease/water mixture into a grease component and a gray water component, the separator unit comprising a vessel including an inlet, an outlet, a bottom, a first baffle, a second baffle and a removably attachable focusing plate within a portion of the vessel bounded by the bottom, first baffle and second baffle such that the focusing plate is inclined with respect to the horizontal so as to urge a grease component of the grease/water mixture to an access port proximal to that portion of the focusing plate furthest from the bottom while diverting a gray water component of grease/water mixture to the outlet;

(c) a retainer for storing the grease component;

(d) an inlet line for transmitting the grease/water mixture from the source to the separator unit, the inlet line facilitating communication between the source to the separator unit;

(e) an outlet line for directing the gray water component from the separator unit to a drain or a sewer line, the outlet line facilitating communication between the separator unit and the drain or the sewer line, wherein the outlet line for directing the gray water component defines a line of division between the grease component and the gray water component below the top of the focusing plate; and (f) an access line for directing the grease component from the separator unit to the retainer, the access line facilitating communication between the separator unit and the retainer.

11. A system according to claim 10, wherein the source comprises one or more of a sink, a dishwasher, a cooker, pasteurizer, a blancher, an oven, a dryer, and a grille.

12. A system according to claim 10, further comprise a filter between the source and the separator unit, wherein the filter removes solids from the grease/water mixture before its introduction into the separator unit.

13. A system according to claim 10, wherein the focusing plate is part of a removably attachable insert, the insert comprising insert sidewall extending from the focusing plate.

14. A system according to claim 11, further including a seal along the perimeter of the focusing plate, the seal preventing movement of any one of the grease/water mixture, the grease component, and the gray water beyond the focusing plate.

15. A system according to claim 10, further including a first barrier and a second barrier, the first and second barrier residing between a sidewall of vessel and a sidewall of removable insert and about midway between the inlet end and the outlet end of vessel.

* * * * *